No. 860,061. PATENTED JULY 16, 1907.
H. RÖSNER.
CARPENTER'S BENCH.
APPLICATION FILED DEC. 29, 1906.
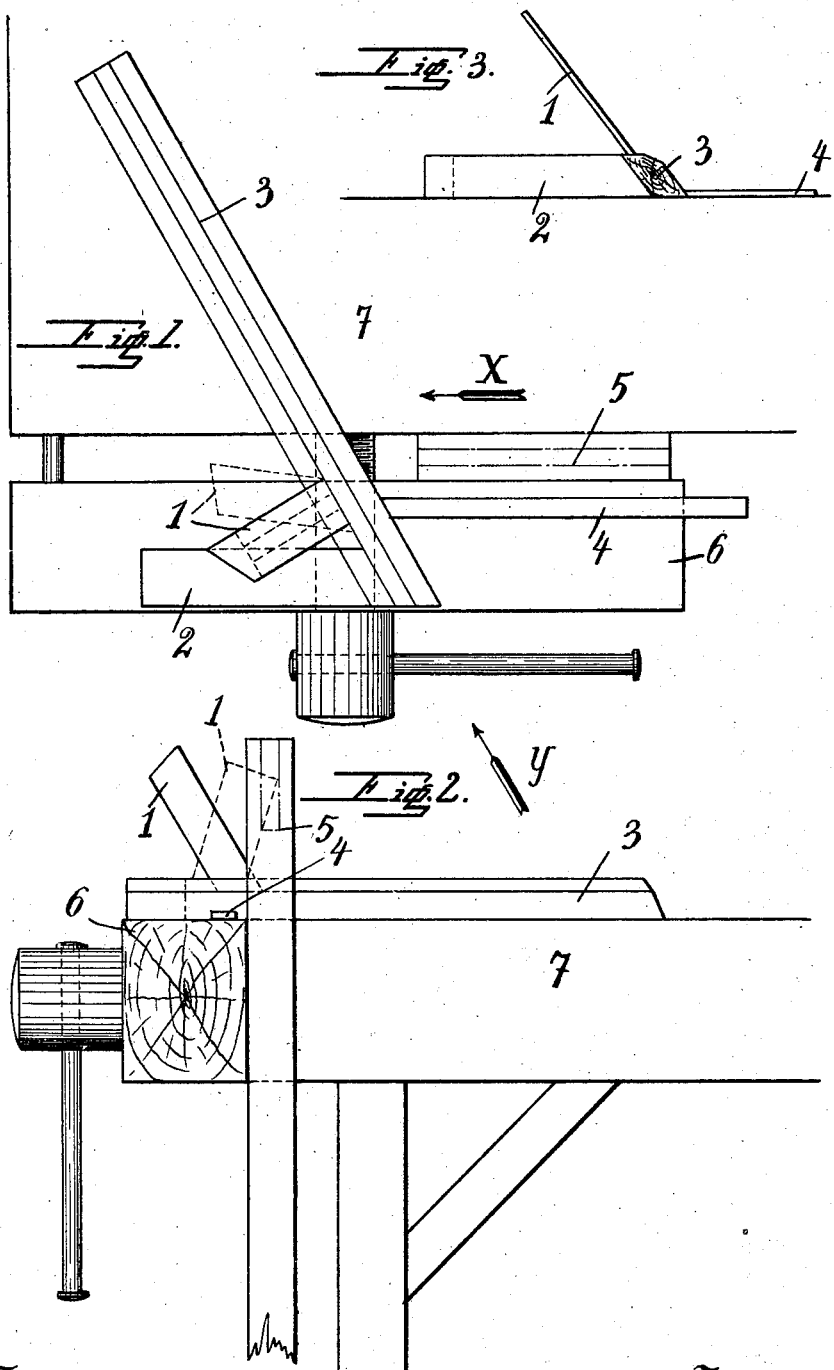
Witnesses:
Matth. Henn
Ludw. Greene
Inventor:
Heinrich Rösner
By Wilhelm Kirschbaum
Attorney

UNITED STATES PATENT OFFICE.

HEINRICH RÖSNER, OF ESSEN-ON-THE-RUHR, GERMANY.

CARPENTER'S BENCH.

No. 860,061.　　　　　Specification of Letters Patent.　　　　　Patented July 16, 1907.

Application filed December 29, 1906. Serial No. 350,051.

*To all whom it may concern:*

Be it known that I, HEINRICH RÖSNER, a subject of the German Emperor, and a resident of Essen-on-the-Ruhr, Germany, have invented certain new and useful Improvements in Carpenters' Benches, of which the following is a specification.

This invention relates to improvements in carpenters benches and its object is to provide means by which the so-called slotting, *i. e.* the grooves and tenons on planks for doors or the like, can be made in an exact, quick and easy manner with the saw. These means consist in a suitably arranged mirror which is so placed that the carpenter, besides being able to observe the top and front marks made on the plank for sawing the tenons and grooves, can at the same time see through it also the rear marks made on the plank, which was hitherto without the mirror arrangement only possible for him by leaning forward, whereby the carpenter was of course very much disturbed in his work. The mirror is further so placed that it does not disturb the carpenter when sawing. The new arrangement of such a mirror is shown on the accompanying drawing in which Figure 1 is a fragmentary plan of a carpenters bench with the plank to be worked and the mirror attached thereto; Fig. 2 is a right hand side view, *i. e.* in the direction of the arrow $x$ of Fig. 1; and Fig. 3 a view of the mirror arrangement as seen in the direction of the arrow $y$ in Fig. 1.

The mirror 1 has the form of a trapezoid and is inserted in an angular holder which consists of a short member 2 and a long member 3 inclosing both an angle of 60°. This angular holder 2, 3 has a handle 4 by means of which it can be easily set to the right position on the bench from the stand of the carpenter. The short member 2 serves, when its front edge lies parallel to or flush with the front edge of the clamp 6 of the bench 7, to determine the proper position of the mirror 1, while the long member 3, is provided with a slot which serves for the reception of the mirror 1 which is set therein in an oblique way, for which purpose the member 3 is disposed at an angle of 60° to the surface of the bench (see Fig. 3).

The long member 3 is made rather long so as to rest on the surface of the bench 7 and to serve thus as counterweight for the short member 2 when the latter should move beyond the clamp 6 when sawing, so that the holder can not easily fall down.

The slot in the member 3 for receiving the mirror 1 is so disposed that the rear marks provided on the plank 5 to be worked, can easily be seen in the mirror, together with the front and top marks which can be seen naturally, from the stand of the carpenter; while the mirror is so placed that it does not disturb the carpenter while sawing, as this is clearly shown in Fig. 1. In this figure the mirror 1 is shown in full lines as inserted in the slot of the long member 3 with its straight short side, which position is that suiting the straight slotting of the plank. If, however, the plank is to be worked so as to provide dovetail-shaped grooves and tenons on the same with a saw specially designed therefor, the mirror must be inserted in the slot of the member 3 with its oblique short side, as this is clearly shown by the dotted lines at 1ª in Figs. 1 & 2.

Having fully described my invention what I claim and desire to secure by Letters Patent is:—

In a carpenters bench, a mirror device for facilitating the so-called slotting on planks with the saw, comprising in combination with the bench (7), its clamp (6), a short member (2) placed with its front edge parallel to or flush with the front edge of the clamp of the bench so as to determine the proper position of the device on the bench, a long member (3) integral with said short member (2) so as to inclose with the latter an angle of 60° and made rather long so as to rest on the bench and to serve thus as counterweight for the short member (2) in order to prevent the same from falling down, when unintentionally displaced, and disposed at an angle of 60° to the surface of the bench and provided with a slot, a handle (4) integral with said long member (3), and the mirror proper (1) shaped like a trapezoid and inserted in the slot of said long member (3) so that it is set therein in an oblique way in such a manner that it does not disturb the carpenter in sawing and that the rear marks provided on the plank (5) to be worked, can be seen in the mirror at the same time as the front and top marks from the stand of the carpenter, substantially as described and shown.

In testimony whereof I have hereunto set my hand in the presence of two subscribing witnesses.

HEINRICH RÖSNER.

Witnesses:
　ALFRED POHLMEYER,
　M. ENGLES.